United States Patent
Swartz et al.

(10) Patent No.: US 11,673,336 B2
(45) Date of Patent: Jun. 13, 2023

(54) CAMERA-BASED MONITORING SYSTEM FOR 3-DIMENSIONAL PRINTING

(71) Applicant: Impossible Objects, Inc., Northbrook, IL (US)

(72) Inventors: Robert Swartz, Highland Park, IL (US); Leonard Wanger, Chicago, IL (US); John Bayldon, Evanston, IL (US); Jeffrey Saltzman, Northbrook, IL (US); Charles Pint, Evanston, IL (US); Eugene Gore, Des Plaines, IL (US); Gintaras Vaisnys, Chicago, IL (US); Giovanni Meier, Madison, CT (US); Alon Henson, Highland Park, IL (US)

(73) Assignee: Impossible Objects, Inc., Northbrook, IL (US)

( * ) Notice: Subject to any disclaimer, the term of this patent is extended or adjusted under 35 U.S.C. 154(b) by 102 days.

(21) Appl. No.: 17/156,565

(22) Filed: Jan. 23, 2021

(65) Prior Publication Data
US 2021/0229365 A1     Jul. 29, 2021

Related U.S. Application Data

(60) Provisional application No. 62/965,096, filed on Jan. 23, 2020.

(51) Int. Cl.
*B29C 64/393* (2017.01)
*G06T 7/00* (2017.01)
(Continued)

(52) U.S. Cl.
CPC ............ *B29C 64/393* (2017.08); *G06T 7/001* (2013.01); *B33Y 10/00* (2014.12); *B33Y 50/02* (2014.12); *G06T 2207/30144* (2013.01)

(58) Field of Classification Search
CPC .................................................. B29C 64/393
See application file for complete search history.

(56) References Cited

U.S. PATENT DOCUMENTS 9,393,770 B2   7/2016   Swartz
9,770,869 B2   9/2017   Comb
(Continued)

FOREIGN PATENT DOCUMENTS

CN    106925784 A  *  7/2017
CN    108778687 A  * 11/2018  ........... B29C 64/118
(Continued)

OTHER PUBLICATIONS

International Search Report for Application PCT/US 2021/014822, dated Apr. 22, 2021, 3 Pages.
(Continued)

*Primary Examiner* — Suresh Suryawanshi
(74) *Attorney, Agent, or Firm* — Dunlap Bennett & Ludwig, PLLC

(57) ABSTRACT

A collection of camera-based monitoring sub-systems can be added to a composite-based additive manufacturing (CBAM) system to autonomously inspect the integrity of each layer and remediate issues in real time. Cameras are located at various stations throughout the process. Resulting images are analyzed to see if processed pages are within tolerance based on comparison with models. Cameras can be placed at the print platen, on a rear conveyor that conveys powdered pages to the stacker and in the stacker itself to make sure pages are stacked and aligned properly. The present invention provides quality assurance and quality control to validate the build process at the layer level. This reduces the amount of post-build labor to perform, and since it shows data internal to the part, it dramatically reduces the amount of destructive testing required.

6 Claims, 7 Drawing Sheets

(51) Int. Cl.
*B33Y 50/02* (2015.01)
*B33Y 10/00* (2015.01)

(56) References Cited

U.S. PATENT DOCUMENTS

| | | | |
|---|---|---|---|
| 9,776,376 B2 | 10/2017 | Swartz | |
| 9,827,754 B2 | 11/2017 | Swartz | |
| 9,833,949 B2 | 12/2017 | Swartz | |
| 10,046,552 B2 | 8/2018 | Swartz | |
| 10,252,487 B2 | 4/2019 | Swartz | |
| 10,350,877 B2 | 7/2019 | Swartz | |
| 10,377,080 B2 | 8/2019 | Swartz | |
| 10,377,106 B2 | 8/2019 | Swartz | |
| 10,384,437 B2 | 8/2019 | Swartz | |
| 10,597,249 B2 | 3/2020 | Swartz | |
| 10,751,987 B2 | 8/2020 | Swartz | |
| 10,934,120 B2 | 3/2021 | Swartz | |
| 11,104,077 B2 | 8/2021 | Daniels et al. | |
| 2017/0057170 A1* | 3/2017 | Gupta | G05B 19/4099 |
| 2017/0151719 A1 | 6/2017 | Swartz | |
| 2017/0274595 A1* | 9/2017 | Swartz | B29C 64/314 |
| 2017/0291223 A1 | 10/2017 | Swartz | |
| 2018/0072001 A1 | 3/2018 | Swartz | |
| 2018/0264725 A1 | 9/2018 | Swartz | |
| 2018/0264732 A1 | 9/2018 | Swartz | |
| 2019/0084046 A1 | 3/2019 | Swartz | |
| 2019/0122584 A1* | 4/2019 | McAlpine | B33Y 10/00 |
| 2019/0202164 A1 | 7/2019 | Swartz | |
| 2019/0283333 A1* | 9/2019 | Hwang | G06F 11/3013 |
| 2019/0366626 A1 | 12/2019 | Swartz | |
| 2020/0198234 A1* | 6/2020 | Kuster | B29C 64/393 |
| 2020/0223131 A1 | 7/2020 | Swartz | |
| 2020/0307099 A1* | 10/2020 | Daniels | B29C 64/393 |
| 2020/0384783 A1 | 12/2020 | Swartz | |
| 2021/0200916 A1* | 7/2021 | Roberts | G06F 30/20 |
| 2021/0311440 A1* | 10/2021 | Sundstrom | G06T 7/001 |

FOREIGN PATENT DOCUMENTS

| | | | |
|---|---|---|---|
| CN | 111325155 A | 6/2020 | |
| JP | 2005170649 A | 6/2005 | |
| JP | 2019505416 A | 2/2019 | |
| JP | 2019052039 A | 4/2019 | |
| WO | 2011/036541 A1 | 3/2011 | |
| WO | 2017/139766 A1 | 8/2017 | |

OTHER PUBLICATIONS

Written Opinion of the International Searching Authority for Application PCT/US 2021/014822, dated Apr. 15, 2021, 5 Pages.
Japanese Office Action; JP 2022-54409; dated Feb. 28, 2023.

* cited by examiner

CAMERA-BASED MONITORING SYSTEM FOR 3-DIMENSIONAL PRINTING

This application is related to, and claims priority to, U.S. Provisional Patent application No. 62/965,096. Application 62/965,096 and the following U.S. Pat. Nos. 9,393,770; 9,776,376; 9,827,754; 9,833,949; 10,046,552; 10,252,487; 10,377,080; 10,377,106; 10,384,437; 10,597,249 are hereby incorporated by reference in their entireties.

BACKGROUND

Field of the Invention

The present invention relates to 3-dimensional (3-D) printing and more particularly to camera monitoring for errors during the 3-D process.

Description of the Problem Solved

Composite-Based Additive Manufacturing (CBAM) is a process where sections of a 3-dimensional object are printed on substrate sheets (e.g., carbon fiber) section-by-section using an inkjet printer or lithographic techniques. The printing typically uses an aqueous ink solution, but in some embodiments, can use other solutions or inks. The substrates are then flooded with a powder that can be a thermoplastic material, thermoset, metal or other powder. The powder adheres only to the wet (printed) portions of the substrate. Excess powder is removed from the sheets, and the sheets are stacked on top of one-another. The stack is typically compressed and heated causing the powder layers to fuse forming the 3-D object. Excess solid material can then be removed by abrasion, sand-blasting, chemical means or other removal technique.

During the CBAM process, a flaw in a single layer can ruin the entire in-process build. The process has the unique ability to correct for erroneous layers in the build, for example, the ability to reject and reprint bad pages and then insert the corrected pages into the build. However, prior art methods did not allow for detection of erroneous layers in real time.

Prior art additive manufacturing systems require manual monitoring to observe a build in process. Some prior art systems have added cameras that broadcast a video feed of the build in process to manually monitor from a distance. Some direct metal systems have added cameras to inspect the melt pool, and in limited situations make changes to the process parameters affecting the in-process build. Currently there is no prior art system that can stop an in-process build that is out of tolerance, or salvage an in-process build by correcting for a bad layer.

It would be extremely advantageous to have a system and method that could detect bad pages in real time, and then initiate a remedial process without interrupting the build.

SUMMARY OF THE INVENTION

The present invention relates to camera-based monitoring sub-systems that can be added to a CBAM system to autonomously inspect the integrity of each layer and remediate issues in real time. Cameras are located at various stations throughout the process. Resulting images are analyzed to see if processed pages are within tolerance based on comparison with models. Cameras can be placed at the print platen, on a rear conveyor that conveys powdered pages to the stacker and in the stacker itself to make sure pages are stacked and aligned properly. The present invention provides quality assurance and quality control (QA/QC) to validate the build process at the layer level. This reduces the amount of post-build labor to perform QA/QC and, since it shows data internal to the part, it dramatically reduces the amount of destructive testing required.

DESCRIPTION OF THE FIGURES

Attention is now directed to several drawings that illustrate features of the present invention.

Figure 1:
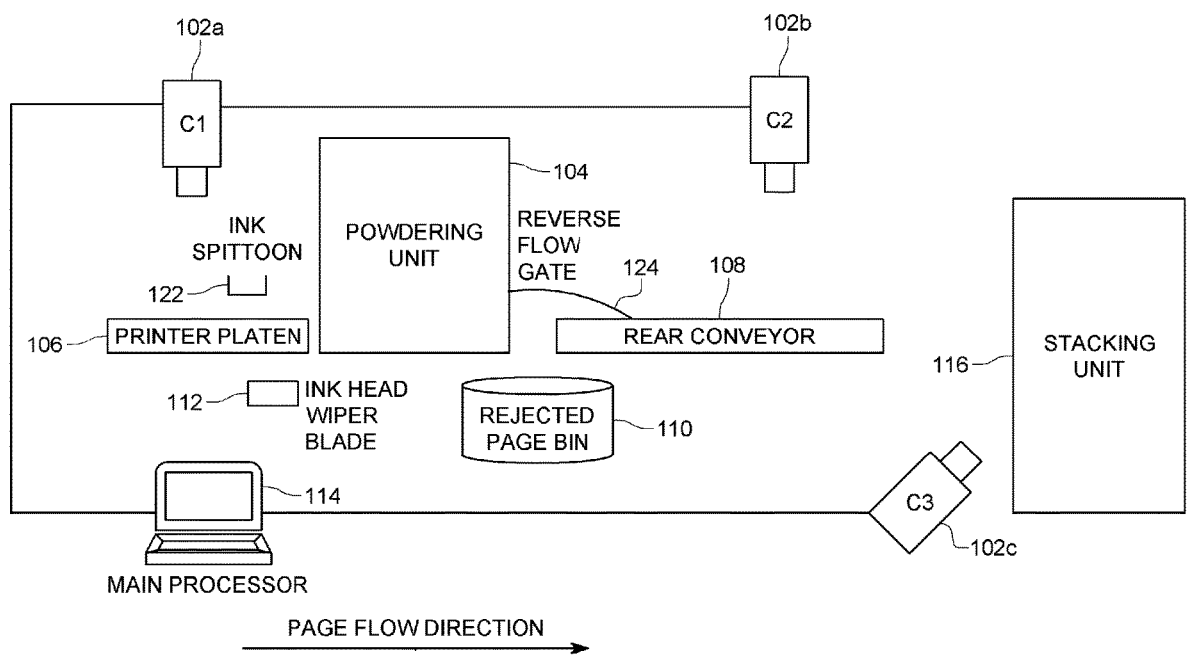
FIG. 1 shows a portion of a typical CBAM process including camera locations for the present invention.

Several figures and illustrations have been provided to aid in understanding the present invention. The scope of the present invention is not limited to what is shown in the figures.

DESCRIPTION OF THE PREFERRED EMBODIMENTS

The present invention relates to camera-based monitoring sub-systems that can be added to a CBAM system to autonomously inspect the integrity of each layer and remediate issues in real time. These monitoring systems are used for several purposes in the CBAM printing process:

1) Inspection: each monitor in the system inspects for parameters at its stage in the printing pipeline and compares it to idealized process conditions. If the difference between the two lies within the specified tolerance levels, the layer passes inspection. If not, the layer fails inspection and the system takes corrective actions. Corrective action can include:

Adjusting process parameters: to correct the issue (e.g. adjusting vacuum levels to optimize the level of powder deposition on the page.)

Rejection and reprinting of inadequate pages: rejected pages are removed, either automatically or manually, and replacement pages are reprinted.

Pause the print process: in cases of catastrophic failure the print job is paused and the operator notified of the situation.

2) Logging: inspection data is logged to a file, database or web (or cloud) service. The logged data can include the full scanned image, reduced resolution images, ancillary and calculated data (e.g. how far out of tolerance the measurements were), and metadata from the analysis of the layer. The log data is used for several purposes:

Monitoring: the logged data, can be used for real-time monitoring of the running print job. An operator can use this real-time feed to monitor the system either from a display, on a printer or remotely.

Quality Control (QC): log data can be used to validate that build conditions were within specified tolerances.

Post mortem analysis: log data can be used for post mortem analysis of the build process. For instance, layer data can provide useful information in analyzing part failures.

Maintenance: logged data is useful to monitor the operating condition of the system for maintenance purposes.

Detecting issues during the build process can save tremendous amounts of time and money. In addition to reducing the amount of time the machine is tied up completing a part that will be discarded, it also reduces the amount of wasted material. Further, in-process monitoring reduces the risk of bad parts entering the supply chain, where failures in the build process can lead to catastrophic part failures such as delamination.

Several camera-based monitor systems are mounted within the build chamber of the CBAM printer. Each monitor is focused on a specific area of the printer and runs inspection software to inspect the conditions for a specific portion of the printing pipeline. The monitor processes can be attached directly to the main processor, or run as autonomous units (separate processes), on the main processor or a dedicated processor. Communications to the monitor can be by inter-process communication, file, or network.

FIG. 1 shows a stylized portion of a typical CBAM process. Substrate sheets are fed onto a printer platen 106 where they are to represent sections of the 3-D build object and printed with a fluid in the pattern of that section. An ink spittoon 122 and ink head wiper blade 112 are shown for completeness. Printed sheets are then transferred to a powdering unit 104 where they are flooded with powder. The powder adheres only to printed areas. A first camera C1 102a monitors the printing process. After excess powder is removed, powdered pages are transferred onto a rear conveyor 103 by a reverse flow gate 124 to be conveyed to a stacking unit 116 where they are stacked one on top of another. A second camera C2 102b monitors the rear conveyer, an a third camera C3 102c monitors the stacker. All three cameras feed video to a processor 114. A rejected page bin 110 holds any rejected pages. These can be discarded, or manually analyzed.

Each camera monitor system is registered with the processor 104. When a page is sent through the print process, the processor informs each monitor process, either directly or via broadcast, that a page is in transit. The message contains idealized process information (the model) and acceptable tolerance intervals for the layer. The monitor then captures sensor data (e.g. camera image) for the page as it passes into view and performs a classification algorithm to measure whether the captured data meets the specified tolerance conditions. The monitor process then informs the main processor of the classification result and any associated data from the analysis. The main processor then logs the data and takes any needed corrective actions.

The classification algorithm used within each monitor is dependent on the analysis required at the stage of printing that it is inspecting. If the page meets the tolerance conditions, a GOOD_PAGE classification is returned to the main process. If the page does not meet the specified tolerances, a BAD PAGE classification is returned. In either case, the monitor process also provides the sensor data and associated data such as measured and calculated values. Table I lists nonlimiting examples of the various types of errors, tolerances and parameters that the system of the present invention might be configured to monitor.

TABLE I

Error/Tolerance/Parameter Types powdering of sheets are within tolerance
sheets are stacked correctly
print nozzles are missing or clogged
zebra stripes appear on a powdered sheet TABLE I-continued Error/Tolerance/Parameter Types printing is crooked or skewed with respect to sheet boundaries
uncut or partially cut chads exist on sheets
page on platen error (no page)
page position and orientation on platen error
no page detected (other than platen)
page position on a conveyor
missing or displaced swath of powder printing on sheet
streaking of powder on sheet
low powder on sheet
leading or trailing edge of powder on sheet
residual powder on sheet
air bubble in print nozzle
bad fabric on sheet
page arrival at stacker
double page Whenever possible the classifier returns a more detailed classification of the issue. The main process will base any subsequent actions (e.g. corrective actions) on the details of the classification. Not shown in FIG. 1 is further information that may be returned regardless of whether the page is classified as good or not. For instance, an estimation of the powder deposition rates may be estimated from the captured image. If the deposition rate is low, within tolerance or not, the classifier sends the data to the main process so that an increase in the powder deposition rate can be set. This is included with the data provided along with the classification.

Currently, the monitor classification models use standard image processing techniques to look for image features indicative of particular printing artifacts. The printing data for the particular page-print under review may (optionally) be used in this classification, as the ideal to which the actual printing is compared. For instance, thin horizontal lines without powder are indicative of clogged ink jet nozzles, and missing elliptical areas on the print are indicative of air bubbles in the printer head. A library of sample data showing both good pages and examples of different aberrant conditions is maintained for use in training various machine models such as clustering, regression and neural network classification models.

A particular embodiment of the system has three camera-based monitors as shown in FIG. 1. These are independently running Raspberry Pi™ computers with camera module shields (i.e. daughter boards.) The Raspberry Pi's are installed in sealed cases (to prevent incursion of powder and fibers), provide lenses and set screws to adjust focus, have Ethernet interfaces and provide power to LED-based lighting attached and controlled by the Raspberry Pi. The monitoring software is written in the Python language and uses several libraries, such as PIL/Pillow, OpenCV (for image processing), NumPy, SciKit and SciKit-Learn. In addition to cameras, line scanners or other imagining devices can be used to capture high resolution image data.

Contrast between the powdered and non-powdered regions of the page can also enhanced by illuminating the image with lights emitting in the non-visible light spectrum (e.g. UV light) and/or modifying the ink or powder to phosphoresce under particular lighting conditions. This is particularly useful to image low contrast combinations such as Nylon (PA12) polymer powder on glass fabric.

The three monitoring systems show in FIG. 1 are as follows:

1) The Print Platen Monitor C1 102a

This monitor observes page placement on the print platen. It can determine whether there is single page on the platen, whether the position and angle of the page are within tolerance, and whether registration holes are the right shape and in the correct position, and whether the chads from the punched holes are properly removed.

The camera 102a detects when, and how many, pages are on the platen. The image is then captured, and a line detection algorithm is used to determine the location of the corners. The difference in the position and orientation of the desired page placement (model) and placed sheet (image) are calculated. If the differences are within the specified tolerances, the inspector routine informs the main process that the page is good, and the page is cleared to proceed. If they are not within the acceptable tolerances, the inspector informs the main process that the page placement is bad and provides the captured image and the measured position and orientation. Similarly, after printing and punching, another image is captured and circle detection algorithms used to verify the punched holes are well formed, in the correct location and chads removed.

If the main process determines corrective actions are necessary, it first clears any bad pages from the platen by turning off the powdering page detector (which prevents powder from being wasted by powdering a bad page) and sending the bad page(s) to the powdering system. After the page has cleared the powdering system and is deposited onto the rear conveyor, the rear conveyor direction is reversed, causing the reverse flow gate to deflect the sheet into a rejected page bin 110. The conveyor direction is then restored, the page counter is set back to reprint the current page. At this point, the page printing process is restarted. If the main process sees continued misplacement of the page it may either adjust the motor control parameters to correct the placement position (e.g. move more or less in the Y direction) or inform the operator to make corrections.

2) Rear Conveyor Monitor C2 102b

This monitor analyzes pages coming out of the powdering system. It can determine whether the image is placed within tolerance of the punched holes, whether there were any print problems (such as: low or empty ink, low powder deposition levels, missing prints swaths, clogged inkjet nozzles, dripping inkjet heads, and the like), whether the punched holes are in the proper position, whether the punched holes are properly shaped, and whether the chads for the punched holes have been properly removed. This monitor can also examine powder deposition to determine: powder deposition levels, distribution of powder deposition (i.e. evenness of coverage), powder clumping, and residual powder levels (i.e. amount of powder remaining in unprinted areas of the page.) This monitor can also detect pages caught on the conveyor as well as orientation of pages on the belt.

For this monitor, the camera C2 102b is used to capture an image of the page after powdering is complete. It first filters the image to correct for spatial (e.g. perspective correction) and lighting corrections and scales the images to be the same resolution. Not only perspective may be corrected, but any computational lens correction now or in the future known in the art may be used to pre-process and/or calibrate the optics system to prepare it for the classification algorithms. The captured image (i.e. actual page) and model images are then compared. Several measures are used to determine whether the page is acceptable. First, the image is analyzed to determine whether is deviates significantly from the model image. A root mean square difference indicates the overall level of deviation, and detection of specific artifacts through line detection or neural network is used to determine whether the image is well formed. The position of any located anomalies can also be used to trace the issue back to specific print heads and nozzles.

Contrast of the printed and unprinted regions as well as region detection (and indication of the evenness of powder distribution) used to calculate the quality of powder deposition. And circle detection is used to validate the distance of the image to the printed images.

If the printed page is determined to be bad (i.e. not within tolerance) any pages in the printing pipeline are cleared by moving them onto the rear conveyor and reversing the movement to deposit them in the rejected page bin 110. Once cleared, the main process takes any corrective actions such as: flushing and wiping heads, adding more ink or powder, changing powdering parameters to adjust levels of powder and residual powder. Once complete, the page counter is set back to reprint the current page the page printing process restarted.

3) Stacker Monitor C3 102c

This monitor inspects whether the page is properly stacked onto all four registration pins. When a page enters the stacker, the stacker pushes the page to a set position on the registration pins that is in view of the camera and not touching the previously stacked pages, and the monitor process is given a signal (by the main process) to capture an image of the stacked page.

The image is then analyzed by measuring the amount of each pin visible, examining whether any corners are outside the stack area to determine whether the page was successfully placed on all four registration pins, and if not, which pins were missed. Since there is currently no automated method of removing a mis-stacked sheet, the print job is paused for the operator to manually remove or re-stack the sheet. If removed, the page counter is reset, and either way the print job is then restarted.

The main process also determines which, if any, corrective actions need to be taken based on the classification and ancillary data provided by the monitors. If the layer is classified as a good page (i.e. meets the tolerance criteria) the page is allowed to proceed to the next step of the printing process, and if necessary, one or more of the remediation steps is performed.

If the page is classified as a bad page, any pages in the printing pipeline are first cleared. This can be done manually by pausing the machine and instructing the operator to clear the sheets, or automatically by advancing the page onto the rear conveyor and reversing the conveyor's direction until the reverse flow gate deflects the page into the rejected page bin 110 (after which the conveyor direction is restored to the page flow direction.) This is repeated until all pages in the printing pipeline have been cleared. After clearing pages any appropriate combination of the following remediation steps is performed:

Low Ink conditions are remediated by pausing the print job and performing an ink refill. Once the ink level reaches a sufficient level the print job is resumed.

Inkjet anomalies are remediated by moving the print head over the ink spittoon and flushing the ink head after which the print head is moved over the wiper blade to wipe the anomalous print head.

Low powder conditions are remediated by initiating a powder refill event.

Other types of powder issues, such as powder deposition beyond the acceptable range are remediated by changing powder parameter such as vacuum levels, the powder trough aperture, air knife pressure and belt speeds.

Whenever possible, automated tests are performed to test whether the problem has been fixed. This may entail reading sensor values (such as powder levels) or printing diagnostic images (after which the test page is sent to the rejected page bin.) When autonomous corrections cannot be applied, or the corrective action does not fix the issue, the print job is paused and the operator is notified to correct the issue manually. Finally, when the print job is resumed, the page counter is reset and the printing restarted to resume printing where it left off.

In various embodiments, the system may employ certain conventions in aid of the monitoring and classification. Table II shows nonlimiting examples of how such conventions might be deployed.

TABLE II

| Platen Camera Tag | Platen Camera Description | Platen Camera Input | Platen Camera Output | Platen Camera Notes |
|---|---|---|---|---|
| Page on platen | Detect that a page is on the platen | x_page_size (mm), y_page_size (mm), x_tolerance (mm), y_tolerance (mm), rot tolerance (deg) | PAGE_ON_PLATEN, PAGE_NOT_ON_PLATEN | |
| Page position and orientation on platen | Detect whether a page on the platen is placed within acceptable position and orientation tolerances. | x_page_size (mm), y_page_size (mm), x_tolerance (mm), y_tolerance (mm), rot_tolerance (deg) | GOOD_PAGE_POS, BAD_PAGE_POS_X, BAD_PAGE_POS_ROT, x_offset (mm), rot_offset (deg) | |
| No page detected | Page was never detected by the camera. Most likely got caught before exiting the powder system | page in transit | BAD_PAGE_NOT_FOUND | |
| Page position on rear conveyor belt | Detect that a page arrived under the camera on the rear conveyor belt and the position and orientation are at acceptable tolerances. | x_page_size (mm), y_page_size (mm), x_tolerance (mm), y_tolerance (mm), rot_tolerance (deg) | GOOD_PAGE POS, BAD_PAGE_POS_X, BAD_PAGE_POS_ROT, x_offset (mm), rot_offset (deg) | |
| Good punches | Detect that holes are punched and chads are cleared | hole center points (x, y) distance_to_corner (x, y), x_tolerance (mm), y_tolerance (mm) | GOOD_PUNCHES, BAD_PUNCHES | detect unpunched holes or hanging chads. Depending on status num is either number of good/bad punches or number of loose chads found. Also detect that punch is within tolerance of distance to page corners |
| Good powdering | Detect that the page has acceptable powdering | model_bmp, powder_rms_tolerance | GOOD_POWDERING, BAD_POWDERING | To start we can just do a RMS difference of the model image vs the printed image. If the RMS's differ by too much it's a bad page. Note: the reference frame for the images is vs the center point of the punches, not the edge of the sheet |

TABLE II-continued

| Platen Camera Tag | Platen Camera Description | Platen Camera Input | Platen Camera Output | Platen Camera Notes |
|---|---|---|---|---|
| Good powdering | Detect that the page has acceptable powdering | model_bmp, x_tolerance (mm), y_tolerance, powder_stddev_tolerance | GOOD_POWDERING, BAD_PRINT_* | model_bmp is bitmap of the expected print, tolerances are acceptable levels of x/y shift/offset. In future can add more input parameters for allowed RMS difference and stddev of powder levels. |
| | Detect if swaths are displaced relative to each other and holes | model_bmp | x_offset(swath_num), y_offset(swath_num), rot(swathnum), shear_angle(swath_num) y_stretch(swath_num) x stretch(swath num) | |
| | Detect if swaths are wider or narrower than required | | | |
| Good page | The page is positioned, punched and powdered | | GOOD_PAGE | GOOD_PAGE = GOOD_PAGE_ POS & GOOD_ PUNCHES & GOOD_ POWDERING |
| Further processing is less defined. Here are some ideas... | | | | |
| Detect Loose chads | Detect whether loose chads are on the page | n/a | BAD_LOOSE_ CHADS | detect chads that were cleanly punched but are on the sheet. |
| Bad powdering conditions | | | | |
| bad image image too far out of place | | | BAD_PRINT_ OFFSET | a well formed image that is offset too much on the page |
| air bubble | | | BAD_PRINT_AIR_ BUBBLE | A print head had an air bubble. May be able to look at position on page to determine which head(s). |
| zebra striping | | | BAD_PRINT_ ZEBRA | a bank of heads did not print. May be able to sum horizontal lines and compare the sum of pixels to tell all are missing. Could also look for unexpected horizontal edges. |

TABLE II-continued

| Platen Camera Tag | Platen Camera Description | Platen Camera Input | Platen Camera Output | Platen Camera Notes |
|---|---|---|---|---|
| missing swaths | | | BAD_PRINT_ MISSING_SWATH | an entire head did not print. We can pass bounding boxes of each swath as input and verify there are no printed pixels in the entire box. |
| displaced swaths | | | BAD_PRINT_ DISPLACED_ SWATH | a head printed offset from the other heads |
| streaking | | | BAD_PRINT_ STREAKING | a single clogged head did not print. Need to look for blank or dim horizontal line |
| uneven coverage (low powder) | | | BAD_POWDER_ UNEVEN | detect differences in the powdering level of powdered regions. Can look at a histogram of the regions and look for stdev that is too high |
| uneven powdering (leading/ trailing edge) | | | BAD_POWDER_ TRAILING_EDGE | can average regions of the page and look for a anomalies |
| residual powder | | | BAD_POWDER_ RESIDUAL | look at powder level in non-printed areas to see if residual powder levels are too high |
| Stacker Camera | | | | |
| Page stacked properly | Detect that a page stacked properly or did not (and which pins missed) | | GOOD_STACKING, BAD_STACKING (if bad, include list of missed pins) | |

Figure 2:
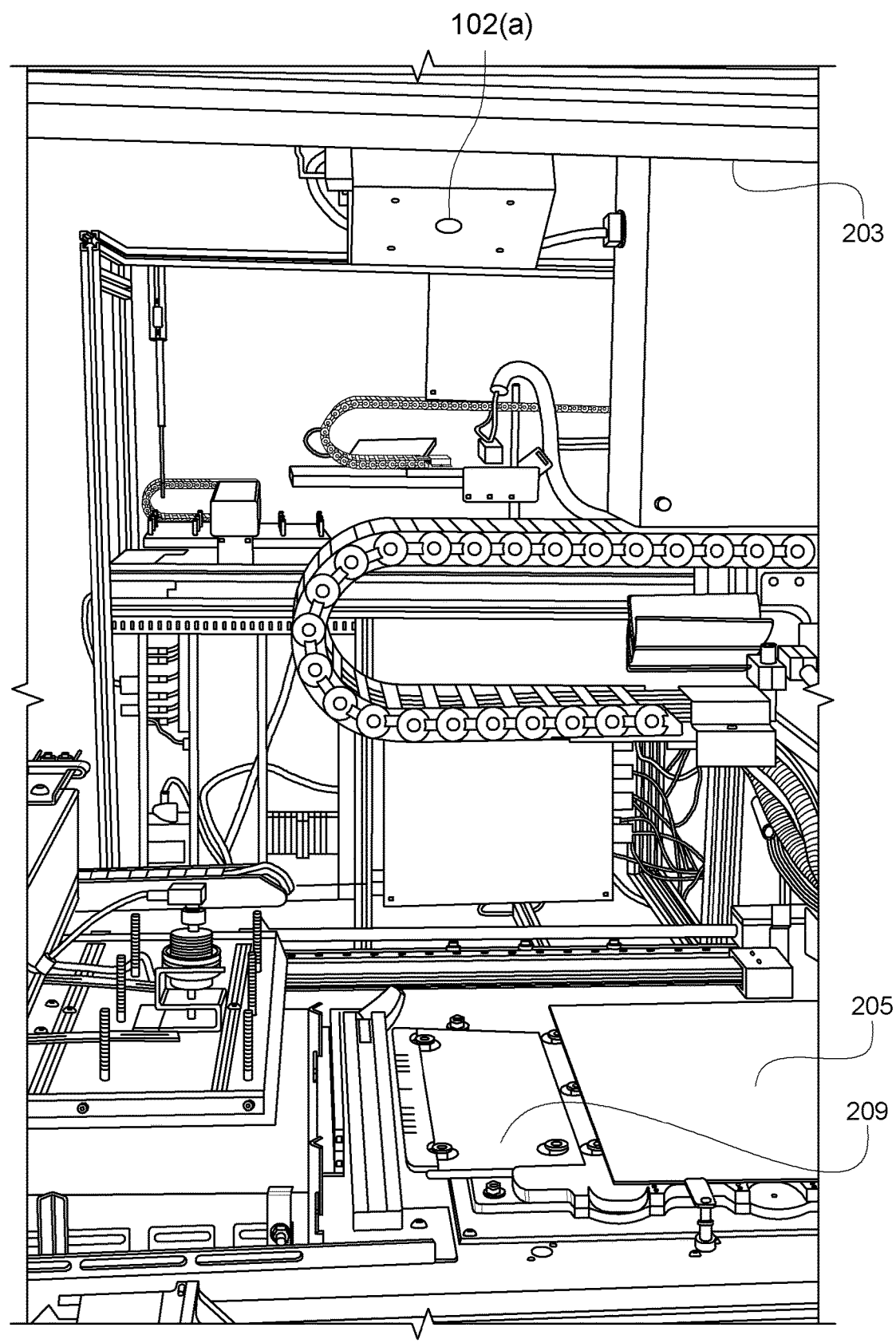
FIG. 2 shows a platen camera and lighting.
Figure 3:
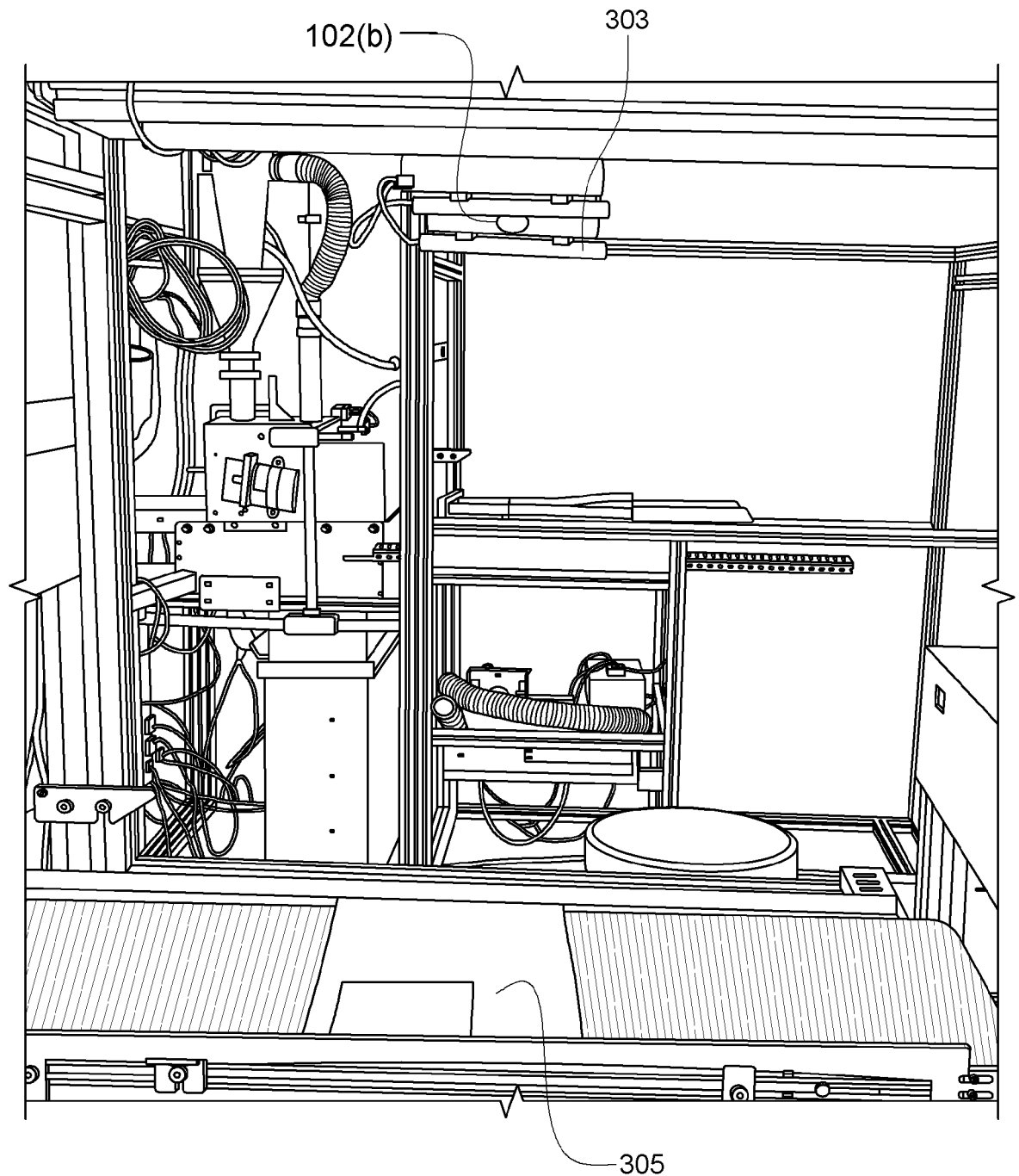
FIG. 3 shows a rear conveyor camera and lighting.
Figure 4:
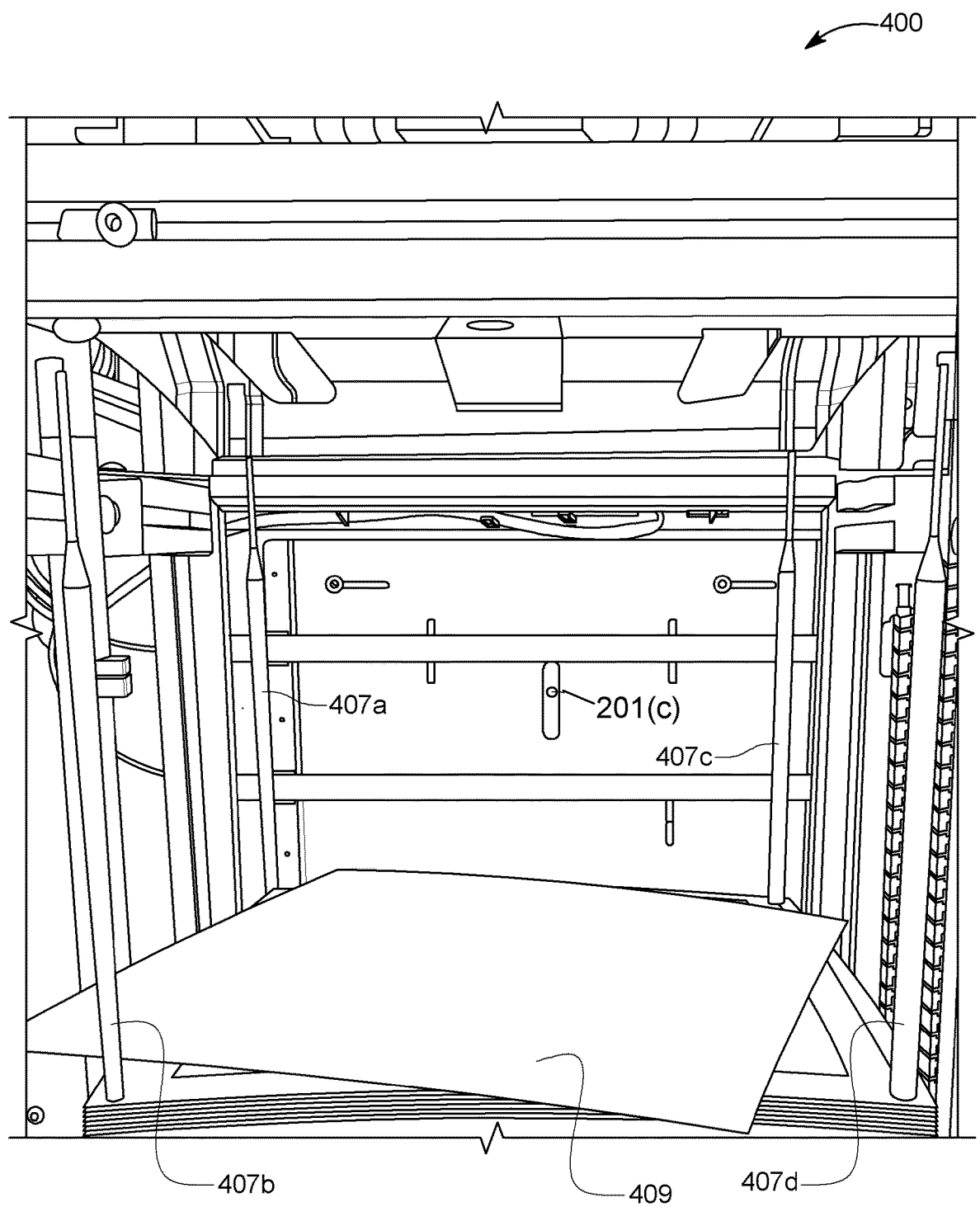
FIG. 4 shows a stacker camera and lighting.

FIGS. 2-4 show detailed schematics of an embodiment of the apparatus and monitoring system. In FIG. 2, the print platen camera C1 102a can be seen at the top of the figure. Lighting 203 for the camera is also above the platen 209. A sheet 205 can also be seen resting on the platen.

FIG. 3 shows the rear conveyor camera C2 102b. Lighting 303 for the rear conveyor camera can be seen near the camera.

FIG. 4 shows the stacker camera C3 102c, four registration pins 407a, b, c, d and a misaligned page 409.

Figure 5:
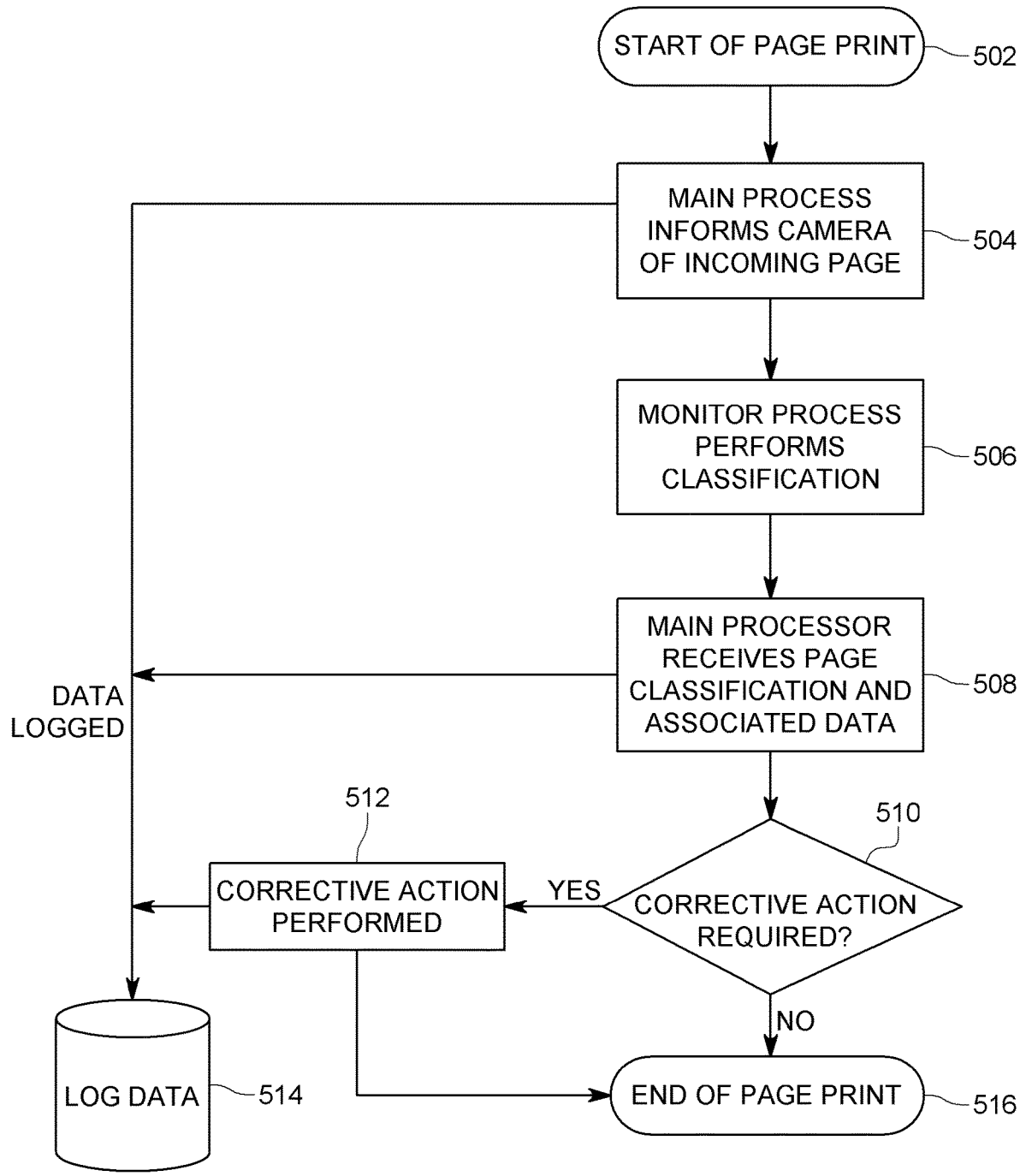
FIG. 5 is a flowchart of the general corrective print process carried out using the print platen camera.

FIG. 5 is a flowchart of the general corrective print process carried out using the print platen camera C1 102a. At the start of print 502 the main process informs the camera unit of an incoming page 504. The camera sends images for analysis to the main processor (or an image processor) and image classification is performed 506. The main processor then receives the page classification 508 and makes a decision 510 whether the page is good, or whether corrective action is necessary (at least one of the required page parameters is out of tolerance). If the page is good, that is the end of that print cycle 516. If the page is bad, corrective action is performed 512. In all cases, data at each step is logged 514.

Figure 6:
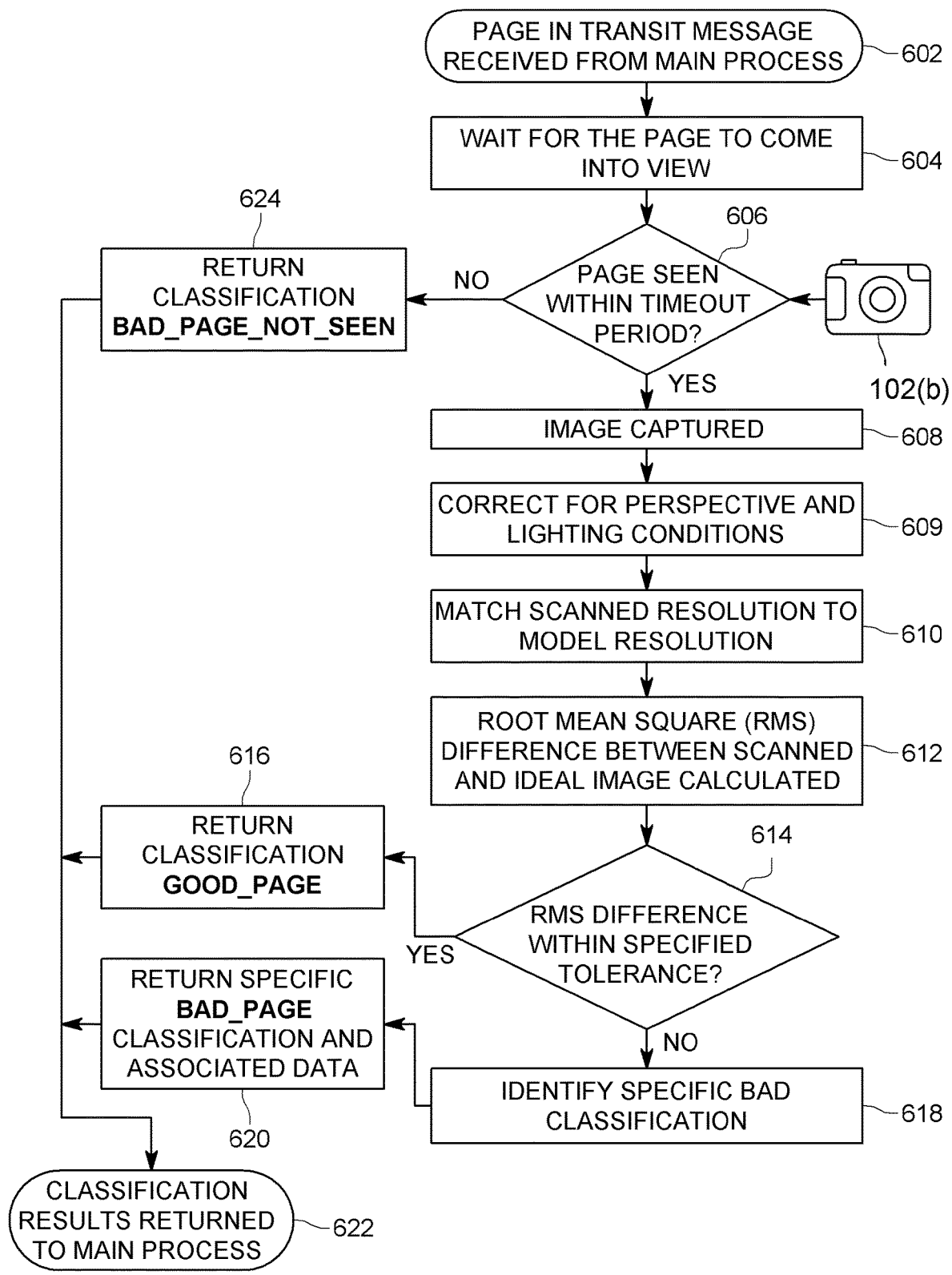
FIG. 6 is a flowchart of the post-powdering classification process.

FIG. 6 is a flowchart of the post-powdering classification process. A page-in-transit message is received 602 from the main process when a page has been printed and is on the rear conveyor. The system waits for the page to come into camera view 604 using the camera C2 102b. If the page is not detected within a predetermined timeout interval, a page-not-seen message is returned 624. If the page is detected, the page image is captured by the camera 608. Correction is made for perspective and lighting conditions 609. (As mentioned, not only perspective may be corrected, but any computational lens correction now or in the future known in the art may be used to pre-process and/or calibrate the optics system to prepare it for the classification algorithms.) A comparison is then made between the corrected scanned image and one or more stored model images 610. A root mean square (RMS) difference between the scanned image and the model is computed 612, and a determination is made as to the size of any RMS error between the two 614. If the powdered page is within tolerance, a good-page classification is returned 616. If the RMS error is too large, a specific bad page classification is determined 618. A bad-page classification and specific associated classification data is return 620. In all cases, the classification results are returned to the main process 622.

The use of Root Mean Square (RMS) difference is one of several techniques that can be used, and is shown in the figures as an example. Any separate monitor and associated classification system may use any image analysis techniques including, but not limited to RMS, neural network classification, and any form of artificial intelligence classification. In fact, any classifier or image analysis system now or in the future known in the art may suffice to perform the in/out of tolerance, error or parameter analysis. The object of the classification is to determine if the page is within tolerances for any number of separate parameters that many generally apply, or may be specific to a particular build.

Figure 7:
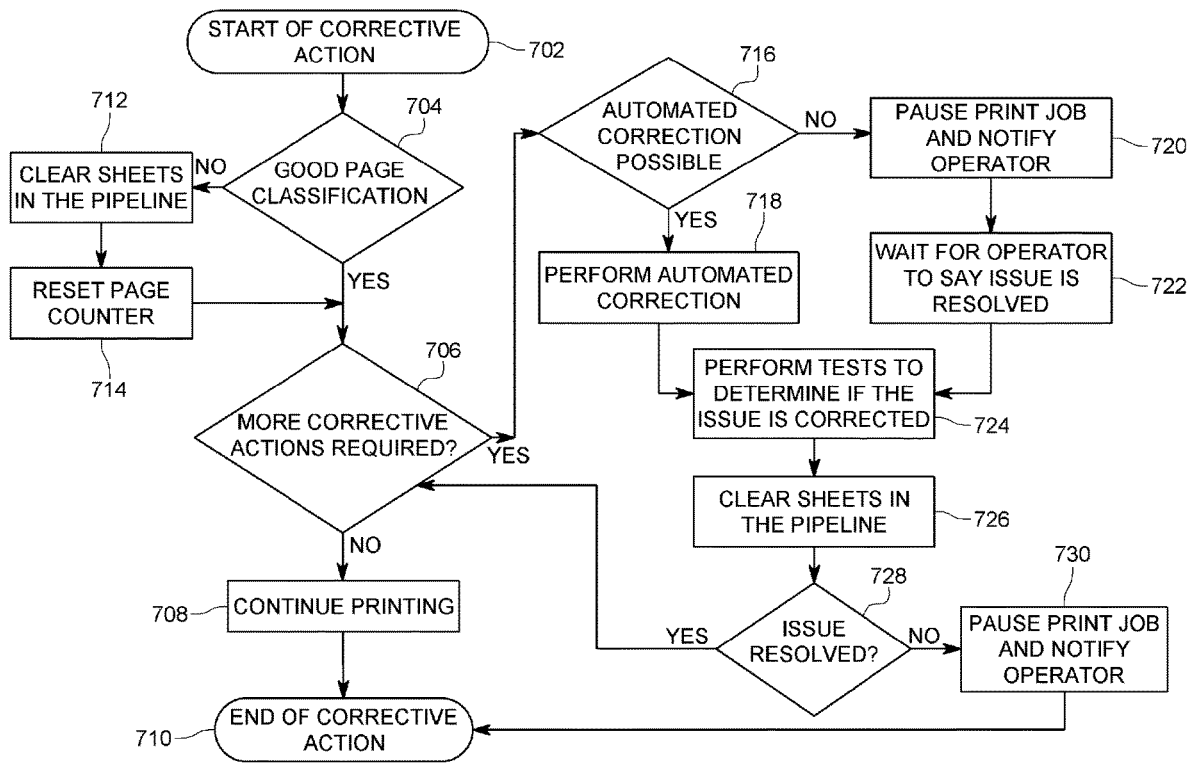
FIG. 7 is a flowchart of the corrective action process.

FIG. 7 is a flowchart of corrective action. Corrective action starts 702 when a bad page is detected at any of the monitoring locations. If there is no good-page classification 704 sheets are cleared in the pipeline 712 and the page counter is reset 714. A good-page classification skips these two steps. A determination is then made whether more corrective action is required 706. If not, printing continues 708, and that is the end of that corrective action cycle 710. If, on the other hand, more corrective action is required, a determination of whether it can be done automatically is made 716. If automated correction is possible, it is performed 718. If not, the job is paused, and the operator is notified 720. A wait is then made until the operator indicates the issue is resolved 722. For either automated or manual corrective action, the next step is to run tests to see if the issue is truly resolved 724. Test sheets cleared in the pipeline 728, and a decision is made whether the issue is truly cleared 728. If yes, it is determined if more (or other) corrective action is necessary 706. If not, printing continues 708, and the corrective action cycle terminates 710. If so, the question of automatic verses manual correction is again determined 716.

While the written description above uses the example of sheets as the substrate, the principles of the invention described herein have equal applicability to web or roll based feeding of substrate material.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A camera monitoring subsystem for a composite-based additive manufacturing (CBAM) process comprising:
   a print platen monitor configured to observe page placement of a sheet on a CBAM print platen, said print platen monitor comprising a first camera system adapted to determine at least one of: a) whether there is single page on the print platen, b) whether the position and angle of the single page are within tolerance, c) whether registration holes in the single page are of correct shape and in a correct position, and d) whether chads from the punched alignment holes are properly removed;
   a rear conveyor monitor configured to analyze single pages exiting a CBAM powdering system, said rear conveyor monitor comprising a second camera system adapted to determine at least one of: a) whether a printed image is placed within tolerance of the punched holes on the single sheet, b) whether there were any print problems with the printed image, c) whether the punched holes are in a proper position, d) whether the punched holes are properly shaped, e) whether the chads for the punched holes have been properly removed, and f) whether powder deposition on the single sheet is within tolerance;
   a stacker monitor comprising a third camera located at a CBAM stacker configured to inspect whether the single page is properly stacked onto registration pins, and if not, which pins were missed.

2. The camera monitoring system of claim 1 wherein the rear conveyor monitor determines powder deposition levels, distribution of powder deposition, powder clumping, and residual powder levels.

3. The camera monitoring system of claim 1 wherein the rear conveyor monitor detects pages caught on the conveyor as well as orientation of pages on a conveyor belt.

4. A corrective action method for a composite-based additive manufacturing (CBAM) process comprising:
   using camera monitors at one or more of the platen, conveyor or stacker locations within a CBAM system to make an automatic determination whether a page traveling through the CBAM system is within tolerance;
   if the determination is that the page is not within tolerance, performing corrective action comprising:
   (1) Determining if automated correction is possible, and if not, pausing a print job and notifying an operator while waiting for the operator to indicate if an issue is resolved;
   (2) If automated correction is possible, performing the automated correction, performing tests to determine if the issue is corrected, clearing the affected sheet from the CBAM system, and restarting printing.

5. The method of claim 4 wherein the automated correction comprises diverting a printed sheet to a rejected page bin.

6. The method of claim 4 wherein the determination of whether a page is within tolerance comprises a determination of one or more of: if powdering of sheets are within tolerance, if sheets are stacked correctly, if print nozzles were missing or clogged, if zebra stripes appear on a powdered sheet, if printing was crooked with respect to sheet boundaries, if uncut or partially cut chads exist on sheets, if a page on platen error exists, if a page position and orientation on platen error exists, if a no page detected error exists, if a page position on a conveyor error exists, if missing or displaced swath errors exist, if streaking errors exist, if a low powder error exists, if a leading or trailing edge error exists, if a residual powder error exists, if an air bubble error exists, if a bad fabric on sheet error exists, if a page arrival at stacker error exists, or if a double page error exists.

* * * * *